United States Patent [19]

Theis

[11] Patent Number: 5,630,315
[45] Date of Patent: May 20, 1997

[54] CATALYST DIAGNOSTIC SYSTEM AND METHOD

[75] Inventor: Joseph R. Theis, Grand Blanc, Mich.

[73] Assignee: General Motors Corporation, Detroit, Mich.

[21] Appl. No.: 556,292

[22] Filed: Oct. 6, 1995

[51] Int. Cl.$^6$ ................................................ F01N 3/00
[52] U.S. Cl. .................................. 60/274; 60/277
[58] Field of Search ................................ 60/274, 277

[56] References Cited

U.S. PATENT DOCUMENTS

| | | | |
|---|---|---|---|
| 5,255,511 | 10/1993 | Maus et al. | 60/274 |
| 5,307,626 | 5/1994 | Maus et al. | 60/274 |
| 5,339,628 | 8/1994 | Maus et al. | 60/274 |
| 5,355,671 | 10/1994 | Maus et al. | 60/277 |

OTHER PUBLICATIONS

Catalytic Converter Diagnosis Using the Catalyst Exotherm, Joseph R. Theis, AC Delco Systems Div. of GMC; SAE No. 942058; Fuels & Lubricants Meeting & Exposition Baltimore, MD; Oct. 17–20, 1994.

Calculating the Rate of Exothermic Energy Release For Catalytic Converter Efficiency Monitoring; Joseph S. Hepburn and Allen H. Meitzler, Ford Motor Company; SAE No. 952423 Fuels and Lubricants Meeting & Exposition; Toronto, Ontario; Oct. 16–19, 1995.

Alternative Technologies for Studying Catalyst Behaviour To Meet OBD II Requirements; Stephen Pelters, Dietmar Schwarzenthal (Porche AG); Wolfgang Maus, Helmut Swars and Rolf Bruck (Emitec GmbH); SAE No. 932854; Fuels & Lubricants Meeting & Exposition; Philadelphia, PA; Oct. 18–21, 1993.

Alternatives for Catalyst Condition Monitoring on Gasoline Emission Control Systems: D. Williams (Lucas Auto. Ltd.); B. Bradshaw (Lucas Auto. Ltd.); No. C–422/017; pp. 1–3; Figs. 1–6.

A Catalytic Oxidation Sensor for the on Board Detection of Misfire & Catalyst Efficiency: Wei Cai & Nick Collings; University of Cambridge; No. 922248; pp. 51–62.

A Linear Catalyst Temperature Sensor For Exhaust Gas Ignition (EGI) and on Board Diagnostics of Misfire & Catalyst Efficiency; Nick Collings & Wei Cai (Univ. of Cambridge); Tom Ma (Ford Motor Co.); David Ball (Kidde–Graviner Ltd.); No. 930938; pp. 167–172.

Primary Examiner—John T. Kwon
Attorney, Agent, or Firm—Anthony Luke Simon

[57] ABSTRACT

A catalytic converter catalyst diagnostic system comprising: a catalytic converter having a catalyst; a first sensor placed in a flow path of an engine exhaust gas flowing into the catalytic converter and providing a first measurement signal indicative of a temperature of the engine exhaust gas before it enters the catalytic converter catalyst; a second sensor mounted in or behind the catalytic converter catalyst and providing a second measurement signal indicative of a temperature of the catalytic converter catalyst; and a controller coupled to the first and second sensors and receiving the first and second measurement signals therefrom, wherein the controller determines a value indicative of exothermic activity of the catalytic converter responsive to the first and second measurement signals and compares the value indicative of exothermic activity to a threshold value, wherein values below the threshold value are indicative of an improperly operating catalytic converter catalyst.

8 Claims, 4 Drawing Sheets

CATALYST DIAGNOSTIC SYSTEM AND METHOD

This invention relates to a catalyst diagnostic system and method.

BACKGROUND OF THE INVENTION

One goal of automotive vehicle designers is an on-board diagnostic system that can measure the effectiveness of vehicle emissions control devices such as catalytic converters. In general a catalytic converter contains a catalyst in the exhaust path that causes certain target species of exhaust gasses to convert to different species that are thought acceptable for tail pipe emissions. For example, the catalytic converter removes HC, CO and NOx from the exhaust gas.

Over time or during certain engine conditions, catalysts may age and lose efficiency at which time the catalytic converter fails to convert the undesirable species of exhaust gases to the desired levels, impairing the vehicle's ability to meet tail pipe emissions standards or goals.

SUMMARY OF THE PRESENT INVENTION

It is an object of the present invention to provide a catalytic converter diagnostics system and method.

Advantageously, this invention recognizes that the efficiency of a catalytic converter in removing $H_2$, HC, CO and $NO_x$ from a vehicle exhaust gas depends on the operability of a catalytic converter catalyst and thus is observable through catalyst parameters. More particularly, the removal of $H_2$, HC, CO and NOx from exhaust gases through activity caused by the catalyst in the catalytic converter is an exothermic reaction releasing heat to and causing a temperature rise in the catalytic converter. Advantageously, then, this invention recognizes that by monitoring the temperature difference between the catalytic converter catalyst and the engine exhaust gases entering the catalytic converter catalyst, the amount of exothermic activity in the catalyst can be quantified. The quantified amount of exothermic activity is used as an indication of the efficiency of $H_2$, HC, CO and NOx conversions from the exhaust gases and, therefore, is used as an indication of the efficiency of the catalytic converter. In this manner the apparatus and method of this invention determine whether or not the catalytic converter is operating properly to meet emission standards or goals.

In a preferred example of this invention, a catalytic converter catalyst diagnostic system is provided comprising: a catalytic converter having a catalyst; a first sensor placed in a flow path of an engine exhaust gas flowing into the catalytic converter and providing a first measurement signal indicative of a temperature of the engine exhaust gas before it enters the catalytic converter catalyst; a second sensor mounted in or behind the catalytic converter catalyst and providing a second measurement signal indicative of a temperature of the catalytic converter catalyst; and a controller coupled to the first and second sensors and receiving the first and second measurement signals therefrom, wherein the controller determines a value indicative of exothermic activity of the catalytic converter responsive to the first and second measurement signals and compares the value indicative of exothermic activity to a threshold value, wherein values below the threshold value are indicative of an improperly operating catalytic converter catalyst.

In another preferred example of this invention, a catalytic converter catalyst diagnostic method is provided comprising the steps of: measuring a first temperature of an engine exhaust gas flowing into the catalytic converter before the gas enters the catalytic converter catalyst; measuring a second temperature of the catalytic converter catalyst; determining a value indicative of exothermic activity of the catalytic converter responsive to the first and second temperatures; and comparing the value to a threshold, wherein values below the threshold value are indicative of an improperly operating catalytic converter catalyst.

DETAILED DESCRIPTION OF THE INVENTION

Figure 1:
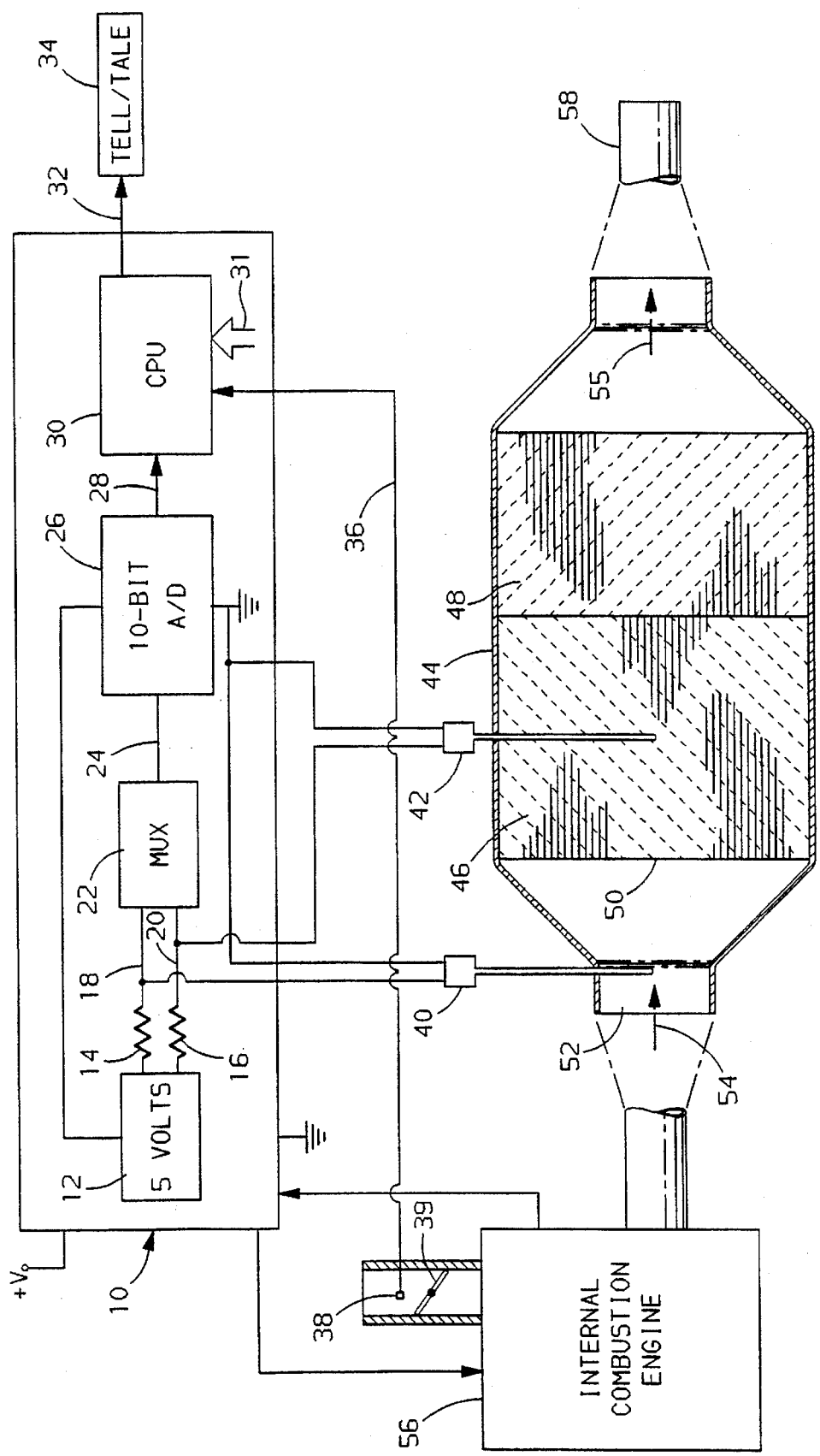
FIG. 1 illustrates a schematic of an example apparatus of this invention.

Referring now to FIG. 1, the system shown illustrates a catalytic converter 44 receiving exhaust gas from internal combustion engine 56 in the direction of arrows 54 and 55. The exhaust gas flows past the catalytic converter catalyst 46, 48, where species of $H_2$, HC, CO and NOx are converted to more desirable gas species ($CO_2$, $H_2O$ and $N_2$). The gas then flows through the vehicle muffler (not shown) and out of the tailpipe 58 as exhaust gas acceptable to regulatory or vehicle designer standards.

The catalytic converter 44 and catalyst 46, 48 are of any suitable type known to those skilled in the art for facilitating the species conversion and need not be set forth in further detail herein.

The system shown uses a temperature difference across a portion of the catalytic converter catalyst to predict the catalyst efficiency. A first sensor 40 is positioned upstream of the catalyst as shown either in the exhaust pipe of the engine 56 or in the inlet cone 52 of the converter. Sensor 40 may be a thermocouple, thermistor or any other suitable temperature sensor. The sensor 40 must be capable of sensing temperature changes in the temperature range of 400° to 800° C with good signal range. It is also preferable that sensor 40 have a response time of ten seconds or less so that it quickly stabilizes after transient maneuvers. Such sensors are known and available to those skilled in the art. Preferably, sensor 40 is located a minimum of three inches upstream of the catalyst block 46 to minimize the effects of heat radiated from the catalyst block 46 onto the sensing element of sensor 40.

A second sensor 42 is placed within the volume of catalyst block 46 approximately two to approximately three inches downstream from the front surface 50 of the block 46. If the catalyst block is short (i.e., two to three inches long), the second sensor may be placed behind the catalyst. Sensor 42 may also be a thermocouple, thermistor or any other suitable temperature sensing device with the same response characteristics as sensor 40. Monitoring the differences between the temperatures of the pre-catalyst exhaust gas and the catalyst where sensor 42 is located allows monitoring of the front section of the converter. This is significant as the light off of the converter generally occurs in the front section of the catalyst. Even though the exotherm is measured once the converter is warmed up, the exotherm measured in the front section of the catalyst provides an indication of the light off ability of the catalyst, which may be a critical factor in obtaining low emission levels specified by more stringent regulations.

In addition to providing good sensitivity for detecting small increases in hydrocarbons, the location of sensor 42 in the catalyst block from approximately 2 inches to approximately 3 inches into the block provides rapid exotherm stabilization after transient maneuvers and allows virtually all known catalyst deactivation mechanisms to be detected including, poisoning, long term thermal deactivation, and high speed misfire conditions. Placement of sensor 42 too close to the front of the catalyst might prematurely signal a malfunctioning catalyst because the front portion of the catalyst could be burned out or otherwise operating inefficiently while the remainder of the catalyst is successfully converting the target species. Another problem with placing the sensor 42 too close to the front of the catalyst is that the diagnostic may misdiagnose catalysts that are deactivated by high speed misfire. Under high flow conditions, significant catalyst volume is required to oxidize the unburned hydrocarbons. Consequently, the high temperature reactions that can cause deactivation are located further back in the catalyst. Thus the front of the catalyst will still operate correctly but portions of the catalyst further back from the front may be deactivated. If the second sensor is too close to the from of the catalyst, the diagnostic may inappropriately indicate that the catalyst is properly working when in fact the catalyst is been deactivated by high speed misfire.

Placement of the sensor 42 too far back in the catalyst may be impractical because the temperature stabilization time of the monitored catalyst volume is longer and, in many driving scenarios (i.e., city driving involving repeated acceleration and braking of the vehicle), the monitored volume may never achieve temperature stabilization. Placement of the sensor 42 may vary with different catalytic converter structures but is preferably in a location in the converter that reaches temperature stabilization within 10–20 seconds of when the exhaust flow stabilizes.

Electronic controller 10 has an internal 5 volt power supply that, via resistors 14 and 16, provide a bias on lines 18 and 20 to the sensors 40 and 42, which are thermistors in this example. Resistor 14 in series with sensor 40 and resistor 16 in series with sensor 42 comprise voltage dividers so that the voltages on lines 18 and 20 are relational to the resistances of the sensors 40 and 42, respectively, which are in turn relational to the temperatures in region 52 and in block 46, respectively.

The signals on lines 18 and 20 are input to multiplexer 22, which alternately selects the signal on each line 18 and 20 to be provided on line 24 to the 10-bit analog to digital (A/D) converter 26. The A/D converter 26 provides digital signals on bus 28 corresponding to the signal on line 18 representing the temperature sensed by sensor 40 or the signal on line 20 representing the temperature sensed by sensor 42, whichever is selected. The signals on line 28 are processed by the microprocessor 30 in the manner set forth herein to determine the exhaust temperature before it enters the catalyst and to determine the catalyst bed temperature in the proximity of sensor 42 and provides, according to this invention, an indication of whether catalytic converter 44 is operating properly.

The microprocessor 30 may, for example, be the microprocessor for the vehicle engine control module, in which case the microprocessor 30 receives other vehicle information through standard input circuits (represented by arrow 31) in a known manner to perform general engine control functions of a type known to those skilled in the art. Such information may typically include temperature of the vehicle engine coolant, the running time of the engine, whether the engine is in closed loop fuel control, and mass air flow (either measured or calculated) flowing through the engine. The example shown includes a mass air flow sensor 38 providing to microprocessor 30, via line 36, a signal indicative of mass airflow metered into the engine by throttle 39. The microprocessor 30 uses this information from bus 31 and the temperature input signals on bus 28 in an interrupt loop that periodically runs, for example, once per second, to monitor the operation of the catalytic converter 44.

During the interrupt loop, the microprocessor 30 first determines several diagnostic enabling criteria. In general, the diagnostic enabling criteria is met when the engine is operating, but has not just been started cold, and when the engine is operating in a substantially steady state condition. Determining whether the engine is operating in a steady-state condition can be done through a variety of tests, the tests herein described are the preferred example and substitute tests that may occur to those skilled in the art are considered equivalents. In this example, microprocessor 30 first checks the engine running flag to determine if the vehicle engine is running, checks whether the engine coolant temperature exceeds a minimum threshold and checks whether the engine has been running for a predetermined time, for example, at least 200 seconds. The microprocessor 30 also checks to determine whether the engine is running in closed loop fuel control (indicating that it is not in start up fuel control mode). If all above criteria are passed, the controller measures and stores a series of temperature measurements from sensors 40 and 42 and mass air flow measurements from sensor 38 over a specified period of time (e.g., twenty seconds). After the series of measurements are stored, the computer compares the difference between the minimum and maximum mass air flow values and, if the difference is less than a predetermined level, determines that the exhaust flow has been stable enough to allow monitoring of the catalytic converter 44. If the difference between the minimum and maximum flows is above the predetermined threshold, the routine indexes the table of stored measurements and exits the control loop.

Once it is determined that the flow is sufficiently stable, the temperature measurements from the sensors 40 and 42 are checked to determine if the exotherm of the catalytic converter 44 is stable. The exotherm can be defined by the difference in the temperature between the exhaust gas before it flows into the catalyst and the temperature of the catalyst, and thus is represented by the difference between the measurements from the two sensors 40,42. If the minimum and maximum of the exotherms stored over a specified duration of time vary by greater than a predetermined threshold, then the catalytic converter 44 has not yet stabilized to a point sufficient to allow monitoring of its performance and the routine indexes the table of stored measurements, but does not yet determine the operational status of the catalytic converter.

When the exotherm achieves stability for a prerequisite time, e.g., for fifteen seconds, a moving average of the exotherm is updated and compared to a calibrated threshold. If the exotherm moving average is below this threshold, it indicates a lack of sufficient activity occurring in the catalyst 46 of the catalytic converter to remove enough of the target species to achieve desired exhaust gas emissions results.

Figure 2:
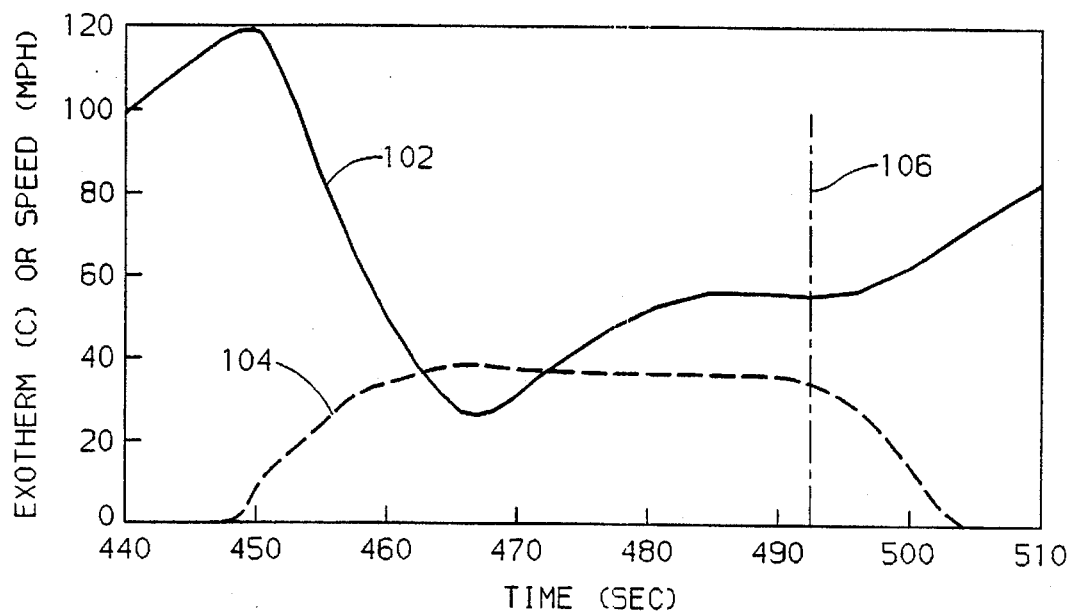
FIG. 2 illustrates example enablement criteria according to this invention.

Referring now to the graph in FIG. 2, the trace 102 shows an example exotherm response in degrees Celsius versus time and vehicle speed, trace 104, over the same period of time. The vertical line 106 illustrates a point during which all of the enabling criteria of the monitoring system are met and the controller is able to monitor the operation of the catalytic converter 44. It is noted that the trace of the exotherm 102 and of the vehicle speed 104 are both fairly stable during the time immediately preceding line 106 correlated to the vehicle engine and exotherm meeting the enabling requirement for the catalytic converter monitoring according to this invention.

Figure 3:
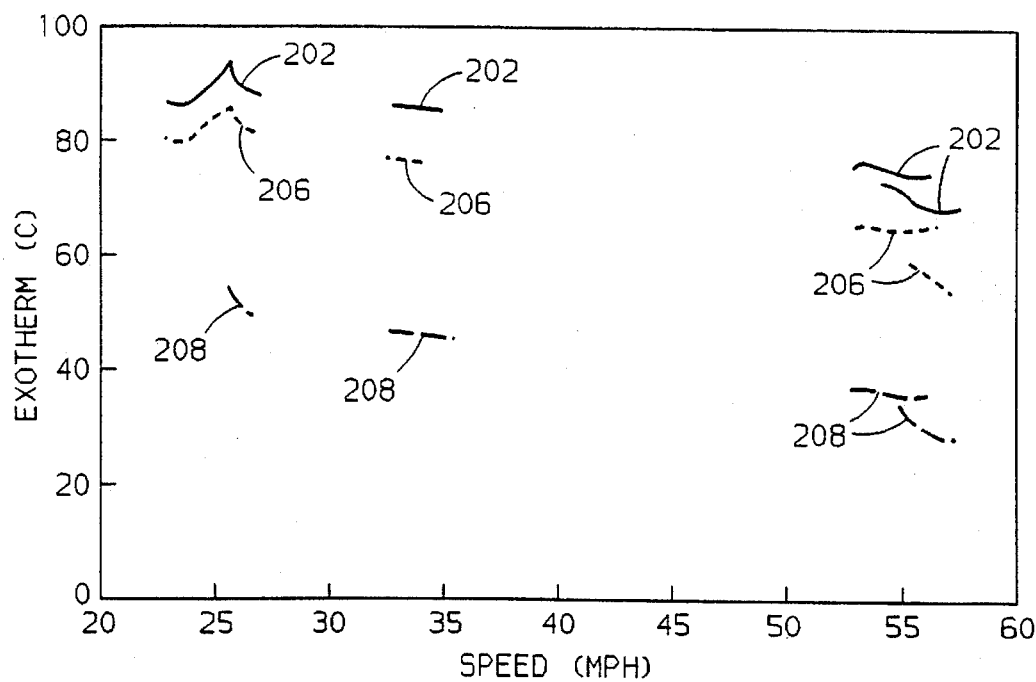
FIG. 3 is a graph illustrating example operation of this invention.

Referring now to FIG. 3, illustrating example catalytic converter operating efficiencies, the plotted traces 202 illustrate the exotherm temperature for a test vehicle operating according to a known test procedure in which is installed a 32 cubic inch catalytic converter that provides 90% HC conversion during the test procedure. The exotherms plotted are those that satisfy all the enabling criteria specified earlier. The exotherms are plotted against vehicle speed that is recorded when the exotherm is recorded. Plot traces 206 illustrate the exotherm temperature detected for the same vehicle when a 32 cubic inch catalytic converter operating at 85% efficiency of HC species removal is installed and traces 208 illustrate the exotherm when a 32 cubic inch catalytic converter operating at 53% efficiency is installed. As can be seen, FIG. 3 demonstrates the correlation between measured exotherm and converter efficiency according to this invention. This invention makes use of this correlation in determining the operating status of the catalytic converter.

As one skilled in the art will notice from FIG. 3, the exotherm satisfying the stabilization criteria appears to decrease with increased vehicle speed or, alternatively, increasing flow rates. This decrease in the exotherm is due to a combination of decreasing emissions emitted from the engine with increased speed as well as decreased conversions in the catalyst volume being diagnosed which results from increased space velocity in the monitored volume. This change in the exotherm with speed may be accounted for, as discussed further below, to minimize the variability of the sampled exotherms.

Figure 4A:
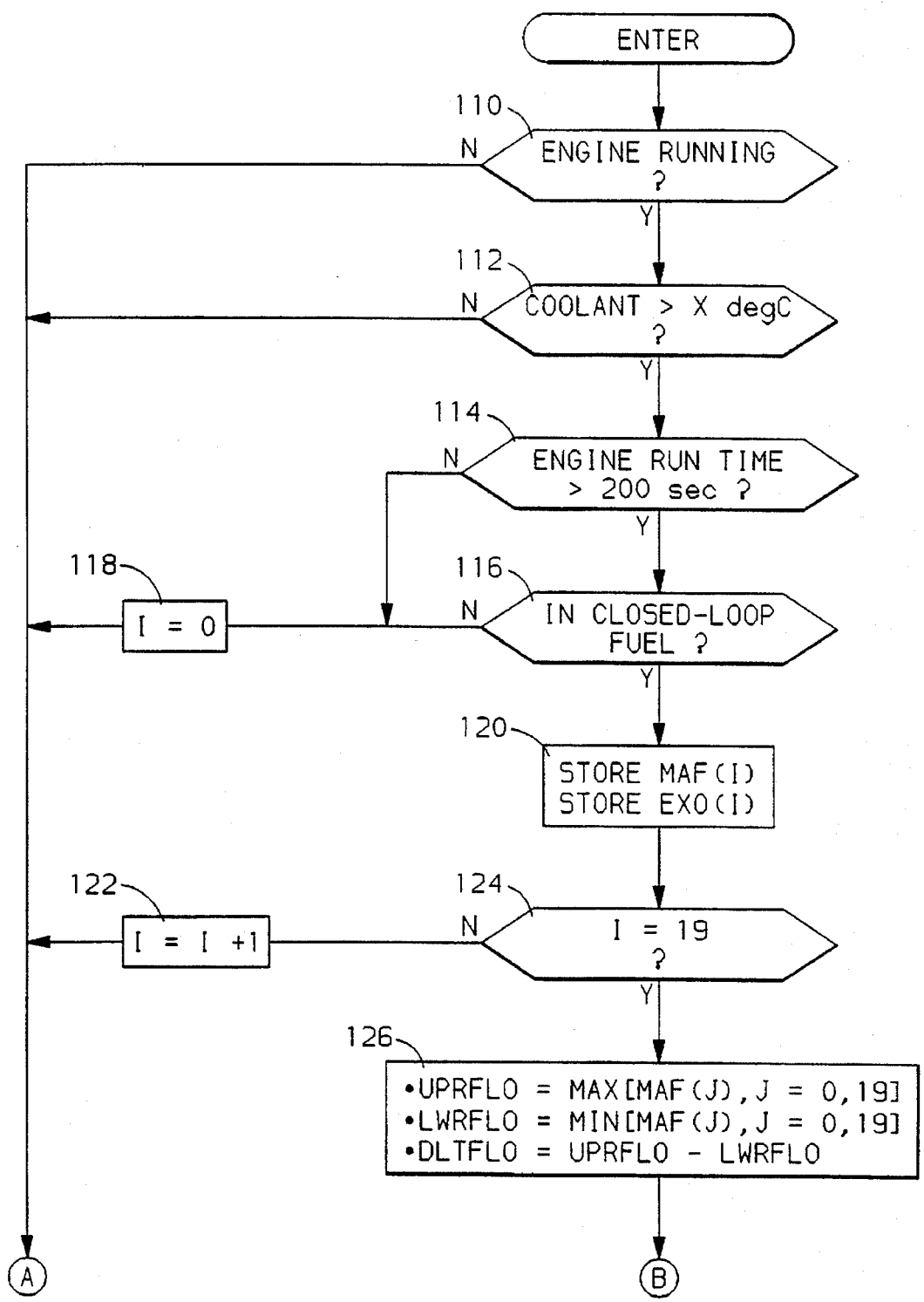
FIGS. 4a and 4b illustrate an example computer flow routine for implementing this invention in a microprocessor controller.
Figure 4B:
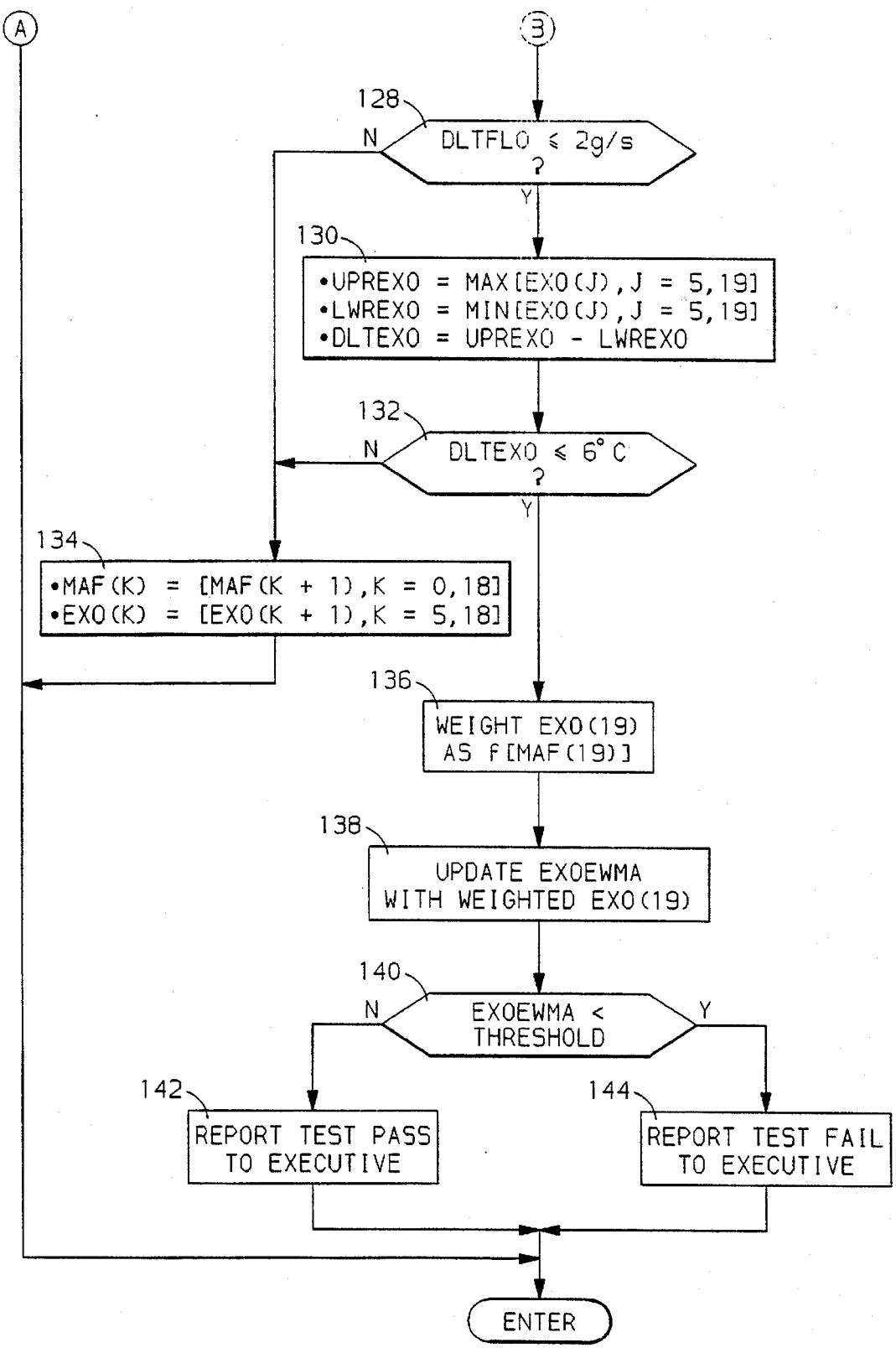

The operation of the microprocessor 30 in performing this determination will be better understood with reference to FIGS. 4a and 4b, illustrating an example flow control routine for the microprocessor 30 according to this invention.

Referring now to FIGS. 4a and 4b, the interrupt routine for monitoring the operation of the catalytic converter 44, which occurs periodically, for example, once per second, begins and moves to block 110 where it checks the engine running flag to determine if the vehicle engine is running. If the vehicle engine is not running, the interrupt routine exits. At block 112 the routine compares the measured engine coolant temperature to a predetermined threshold that will vary from vehicle to vehicle, but is set to indicate that the engine has reached normal operating temperatures.

Block 114 checks the engine running time to make sure the engine has been running for at least a predetermined time period, for example 200 seconds, to allow engine operation to stabilize and the monitored volume of the converter to warm up. If the engine had not been running for the predetermined time period, block 118 sets the counter I to zero and the control loop is exited. Block 116 checks whether the engine control module is in closed loop fuel control, and, if not, moves to block 118 where it sets the variable I to zero and exits the control loop (i.e., the routine may require 20 seconds of continuous closed-loop operation before a diagnostic can be performed). If the tests at blocks 110–116 are passed, the routine at block 120 stores in a first table in controller memory the present measurement of mass air flow flowing through the engine as variable MAF(I) and stores the difference in temperature sensed by the two sensors 42 and 40 in a second table in controller memory as a variable EXO(I).

Block 124 compares the counter I to a predetermined value, T, corresponding to the number of interrupt loops in 20 seconds minus 1, here, for example, T=19, and, if I is not equal to the T, moves to block 122 where I is incremented and exits the interrupt loop. If at block 124, I equals the T, the routine moves to block 126. At this point in time, the tables MAF(I, I=0–T) and EXO(I, I=0–T) are filled. Next the routine determines the stability of the mass air flow measured during the 20 previous seconds. This begins at block 126, where the variables UPRFLO and LWRFLO, corresponding to the maximum and minimum measured mass air flows during the 20 previous seconds (in this case, during the 20 previous control loops since the loop is run once per second), respectively, are used to determine a value, DLTFLO, equal to UPRFLO minus LWRFLO. Block 128 then compares DLTFLO to a predetermined threshold, for example 2 grams per second. If DLTFLO is not less than 2 grams per second, that is, if the mass air flow through the engine varies by more than 2 grams per second during the 20 previous seconds, the routine moves to block 134 where the mass air flow and the exotherm tables are indexed, shifting the data in the table, and then exits.

If at block 128 DLTFLO is less than the predetermined threshold, the routine moves to block 130. Block 130 begins checking for the stability of the exotherm measurements during the last 15 seconds of operation. First a value UPREXO and a value LWREXO are set equal to the maximum and minimum exotherm measurements during the previous 15 seconds of operation. A value DLTEXO is then determined as UPREXO minus LWREXO. At block 132 DLTEXO is compared to a predetermined exotherm threshold, for example, 6° Celsius. If DLTEXO is greater than 6° Celsius, then the routine continues to block 134 where the mass air flow and exotherm tables are indexed. If, at block 132, DLTEXO is not greater than the predetermined exotherm threshold, the routine continues to block 136 where it weighs the value EXO(T) as a function of MAF(T). For example, exotherms collected at high flow rates can be multiplied by a factor greater than one and exotherms collected at low flow rates may be multiplied by a factor less than one. These weighting factors are used to account for the decrease in exotherm with increasing flow rate and, if desired, may be scheduled using a simple look-up table based on flow rate. Then, at block 138, the exotherm exponentially weighted moving average filter, EXOEWMA, is updated with the weighted value of EXO(T). For example:

EXOEWMA(NEW)=0.95*EXOEWMA(OLD)+0.05*EXO(T).

At block 140 the exotherm exponentially weighted moving average filter value is compared to a filter threshold level calibrated to correspond to an exotherm exponentially weighted moving average result that would occur in a failed catalytic converter. This calibration may be done by testing known working and nonworking catalytic converters in a test vehicle and setting the threshold to an exotherm exponentially weighted moving average value slightly below the lowest value a working catalytic converter yields. If at block 140 the filter result is not greater than the filter threshold, the routine moves to block 144 where it reports to the executive control routine that the catalytic converter has failed the test.

If the test is passed at block 140, the routine moves to block 142 where it reports to the executive routine in the microprocessor that the catalytic converter has passed the test. The microprocessor 30 may, when an improperly operating catalytic converter 44 is detected, provide an output signal on line 32, to telltale 34, signaling to a vehicle operator that service on the emission system is required.

As an alternative to the use of weighting factors to account for the decrease in exotherm with increased flow rate, the exotherm within a certain flow range (for example every 5 g/s of flow) can be compared to a threshold value for that particular flow range. Also for example, every ten mile per hour vehicle speed range can be calibrated with its own filter threshold. The comparisons from the different flow ranges can be used collectively to determine if the catalyst is malfunctioning.

In another example, the MAF and EXO tables can be limited to defined vehicle speed ranges. The analysis according to this invention can then be limited to only a certain speed range, i.e., 40 to 50 MPH, or may be done at a plurality of speed ranges.

I claim:

1. A catalytic converter catalyst diagnostic method according to the steps of:
   (a) measuring a first temperature of an engine exhaust gas flowing into the catalytic converter before the gas enters the catalytic converter catalyst;
   (b) measuring a second temperature of the catalytic converter catalyst;
   (c) determining a first value of mass air flow into an engine;
   (d) determining a second value indicative of exothermic activity of the catalytic converter responsive to the first and second temperatures;
   (e) storing the first and second values in respective first and second tables, each table having at least n table locations;
   (f) repeating steps (a)–(e) until the first and second tables are filled;
   (g) comparing a first difference between a first minimum and a first maximum of the first values stored in the first table to a first predetermined threshold;
   (h) comparing a second difference between a second minimum and a second maximum of the second values stored in the second table to a second predetermined threshold;
   (i) if the first and second differences are respectfully less than the first and second predetermined thresholds, then:
      updating a filtered exotherm value according to the second value indicative of exothermic activity; and
      comparing the filtered exotherm value to a threshold, wherein filtered exotherm values below the threshold are indicative of an improperly operating catalytic converter.

2. A catalytic converter catalyst diagnostic method according to claim 1, wherein the step of updating the filtered exotherm value according to the second value indicative of exothermic activity comprises a sub-step of multiplying the second value indicative of exothermic activity by a weighting factor that increases as mass air flow into the engine increases and vise verse.

3. A catalytic converter catalyst diagnostic method according to claim 1, wherein the threshold varies dependent on the first value of mass air flow into the engine.

4. A catalytic converter catalyst diagnostic method according to claim 1, wherein the steps (d)–(i) are only carried out if the mass air flow into the engine is within one of a group of predetermined flow ranges.

5. A catalytic converter catalyst diagnostic method according to claim 1, wherein the steps (d)–(i) are carried out only if a vehicle speed is within one of a group of predetermined speed ranges.

6. A catalytic converter catalyst diagnostic method according to claim 1, wherein the threshold varies dependent on which of a plurality of flow ranges the first value of mass air flow into the engine falls within.

7. A catalytic converter catalyst diagnostic method comprising the steps of:
   (a) measuring a first temperature of an engine exhaust gas flowing into the catalytic converter before the gas enters the catalytic converter catalyst;
   b) measuring a second temperature of the catalytic converter catalyst;
   (c) determining a value indicative of exothermic activity of the catalytic converter responsive to a difference between the first and second temperatures;
   (d) monitoring the difference between the first and second temperatures over a time period;
   (e) enabling use of the value to indicate an operating condition of the catalytic converter only if, during the time period, the difference between the first and second temperatures varies by less than a threshold indicating a change in temperature difference between the first and second temperature sensors.

8. A catalytic converter catalyst diagnostic method comprising the steps of:
   (a) measuring a first temperature of an engine exhaust gas flowing into the catalytic converter before the gas enters the catalytic converter catalyst;
   (b) measuring a second temperature of the catalytic converter catalyst;
   (c) determining a first value indicative of exothermic activity of the catalytic converter responsive to a difference between the first and second temperatures;
   (d) multiplying the first value by a weighting factor that increases as mass air flow into the engine increases and vise verse; and
   (e) updating a second value indicative of an operational status of the catalytic converter responsive to a result of the multiplying step.

* * * * *